United States Patent [19]

Lapeyre

[11] Patent Number: 4,925,016
[45] Date of Patent: May 15, 1990

[54] HEAVY DUTY MODULAR CONVEYOR BELT AND SPROCKET WITH UNIQUE TRACKING

[75] Inventor: James M. Lapeyre, New Orleans, La.

[73] Assignee: The Laitram Corporation, Harahan, La.

[21] Appl. No.: 302,452

[22] Filed: Jan. 26, 1989

Related U.S. Application Data

[63] Continuation-in-part of Ser. No. 105,011, Oct. 6, 1987.

[51] Int. Cl.$^5$ .............................................. B65G 23/06
[52] U.S. Cl. ...................................... 198/834; 198/840; 198/853
[58] Field of Search ........................ 198/834, 840, 853; 474/156, 161, 207

[56] References Cited

U.S. PATENT DOCUMENTS

| 4,213,527 | 7/1980 | Lapeyre et al. | 198/853 |
| 4,597,747 | 7/1986 | Lapeyre | 198/853 |
| 4,729,469 | 3/1988 | Lapeyre et al. | 198/853 |

Primary Examiner—Joseph E. Valenza
Attorney, Agent, or Firm—James C. Kesterson

[57] ABSTRACT

A sprocket and a module for forming a heavy duty, smooth top, straight running conveyor belt which is easy to clean and which uses a center transverse tooth member to receive a driving force from an intermeshed sprocket is disclosed. Each of the modules is suitable for being pivotally connected with a multiplicity of similar modules by pivot rods to construct a conveyor belt. Each of the modules includes first and second pluralities of link ends which are aligned in the module to form first and second pivot axes. Each of the link ends have a topmost portion which has a width which is just less than the space between two adjacent link ends on the same module, such that when intermeshed with link ends of another module a continuous, flush, smooth top surface is provided. The pluralities of link ends of each of the modules are joined by an integrally molded smooth top connecting structure which includes a tooth member extending downward and parallel to the pivot axis. The tooth member further defines driving surfaces on opposite sides for receiving a driving force from a drive recess of a cooperating sprocket to move the module and the belt constructed from a multiplicity of the modules. To achieve tracking, the bottom portion of each link end is substantially narrower than the topmost portion such that spaces are provided between the intermeshed link ends. A multiplicity of tracking teeth are also provided on the cooperating sprocket which are received by the space between the intermeshed link ends.

9 Claims, 3 Drawing Sheets

HEAVY DUTY MODULAR CONVEYOR BELT AND SPROCKET WITH UNIQUE TRACKING

BACKGROUND

This application is a "Continuation-In-Part" of U.S. application Ser. No. 105,011 filed Oct. 6, 1987 and has some similarity to a co-pending application filed this same date and entitled "CONVENOR BELT WITH A CONNECTING MEMBER DRIVE".

TECHNICAL FIELD

This invention relates to a new and simple to manufacture heavy duty, smooth top, straight running conveyor belt and sprocket which is easy to clean and uses a single transverse running member or structure as the means for driving the conveyor belt. More particularly this invention relates to such a conveyor belt which includes a plurality of individual modules pivotally joined by pivot rods. The modules are the type preferably formed by injection molding and which include a first and second plurality of pivot ends which are intermeshed with pivot ends of other modules and the intermeshed pivot ends are held together by the pivot rods. The particular belt of this invention, is driven and provided tracking by a sprocket which in a preferred embodiment contacts the transverse member substantially at the center of the pitch line of each module, and includes a separate tooth received between the intermeshed link ends of adjacent modules to provide tracking.

A typical modular conveyor belt is disclosed in U.S. Pat. No. 3,870,141 issued to J. M. Lapeyre on Mar. 11, 1975. According to this patent, substantially identical modules formed by injection molding are pivotally connected to one another to form a conveyor belt of a desired length. Each module includes a plurality of elongated elements, and each elongated element has a first pivot end and a second pivot end. The plurality of elongated elements are joined together such that the apertures defined in each of the first and second pluralities of pivot ends lie along a first and second pivot axis respectively which are parallel one to the other. The link ends of one module are intermeshed and pivotally connected by means of a pivot rod to the link ends of another module until an entire belt having the desired length is formed. Injection molded plastic belts built according to the teachings of this patent have been well received by industry and have many uses.

U.S. Pat. No. 4,171,045 issued on Oct. 16, 1979 also to J. M. Lapeyre, recognized the need for including a conveyor surface which would not allow objects riding on the conveying surface to slip and thereby allow the belt to pass underneath. A belt disclosed and constructed according to the teachings of the U.S. Pat. No. 4,171,045, is similar to that of the U.S. Pat. No. 3,870,141 patent discussed heretoforth and U.S. Pat. No. 4,051,949 also issued to Lapeyre except that selected ones of the elongated members include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J. M. Lapeyre, et al, further discloses a module for forming a link conveyor belt which has ridges or flight members extending transverse to the direction of travel for preventing the conveyor belt from slipping under articles riding on the conveyor belt surface. Similarly U.S. Pat. Nos. 4,170,281 issued on Oct. 19, 1979 and 4,080,842 issued on Mar. 22, 1978, both to Lapeyre, also show conveying belts having members extending transverse to the conveying surface for moving articles on the conveying surface along the belt such that the belt cannot slip underneath the article. U.S. Pat. No. 4,084,687 issued Apr. 18, 1978 to J. M. Lapeyre discloses a conveyor belt patent not particularly relevant to the present invention except that the top surface is smooth, flush, and very slick.

Other modular link conveyor belt patent applications or patents by J. M. Lapeyre and/or owned by the same assignee as the present invention include:

Ser. No. 483,210 entitled "Link Chain Belt" filed Apr. 14, 1983; Ser. No. 179,523 entitled "Modular Center Drive Conveyor Belt" filed Aug. 19, 1980 now U.S. Pat. No. 4,832,187; and U.S. Pat. No. 4,556,142 entitled "Lightweight Modular Conveyor Belt" issued Dec. 3, 1985.

In addition, a patent application entitled "End-to-End Molded Conveyor Belt Module" filed Oct. 15, 1987 and having Ser. No. 110,109 discloses subject matter wherein modules may be "end-to-end" molded.

A conveyor belt designed particularly for changing horizontal directions or flexing is disclosed in U.S. Pat. Nos. 4,153,152 and 4,184,588 also issued to J. M. Lapeyre on May 8, 1979 and Jan. 22, 1980 respectively.

In addition, U.S. Pat. No. 4,597,747 issued to Lapeyre on July 1, 1986 discloses a snap-together link chain which includes a center member which joins the two receiving legs of the first link end to the single post of the second link end. The center member also provides driving surfaces which cooperate with a sprocker. According to one embodiment, a multiplicity of the chain links are joined together side-by-side by a pair of integrally molded connecting members to form a wide module. However, the belt is not a heavy duty flush top belt, and neither of the two connecting members also function as a single bidirectional drive member, although in one embodiment the two connecting members do define a recess for receiving a driving tooth in the same manner as the Cam Clean ® belts sold by the Cambridge Wire Cloth Company of Cambridge, Md. discussed below with respect to U.S. Pat. No. 4,557,374.

The "All-in-One" ® conveyor belt manufactured by the KVP Company in Sacramento, Calif. and illustrated in FIG. 4 of U.S. Pat. No. 4,742,907 issued May 10, 1988 to Karl V. Palmaer, is a modular plastic belt driven at a central transverse connecting member which can be brick-layed, and therefore can be provided in different widths. However, this belt can be driven in only one direction, and is not a heavy duty flush or smooth top belt.

The plastic modular belt sold by the Cambridge Wire Cloth Company of Cambridge, Md. under the name of Cam-Clean ® mentioned above and substantially described in U.S. Pat. No. 4,557,374 issued on Dec. 10, 1985 to Robert H. Bode is driven in the center area of a module by receiving a tooth in a recess defined in the module by a pair of connecting members.

Thus, a review of the prior art patents and commercial belts as well as pending applications of the assignee of the present invention reveals that to date there has not been a simple and inexpensive modular conveying belt particularly designed with the unique features of this invention. More particularly, none of the prior art conveying belts have heavy duty, smooth top which inherently stays clean, intermeshed link ends which are capable of being driven in both directions and are substantially in contact with each other on the top surface, are centrally driven and readily tracked, and are bricklayable such that the belt can be constructed to any desired width and length. Therefore, it is an object of this invention to provide a module which can be bricklayed to construct a heavy duty, straight tracking wide conveyor belt, and which is easy to clean and inexpensive to construct and use.

It is another object of the present invention to provide a module for forming a smooth top conveyor belt which is modular and has the inherent capability of being easily repaired and replaced.

It is yet another object of the present invention to provide modules for forming a smooth top conveyor belt which is suitable for being driven in both directions and is readily tracked.

It is also an object of the present invention to provide a conveyor belt which is simple, inherently clean, inexpensive to construct, drivable in both directions, and easily tracked.

DISCLOSURE OF THE INVENTION

Other objects and advantages will be obvious, and will in part appear hereinafter and will be accomplished by the present invention which provides a module for constructing a heavy duty smooth or flush top conveying belt driven by a multiplicity of drive sprockets. The conveyor belt includes a multiplicity of pivot rods extending through the pivot holes defined in intermeshed link ends of the modules. Each of the modules have first and second pluralities of link ends joined by an integrally molded intermediate or connecting structure which provides the smooth flush surface of the conveyor belt. Each of the link ends have a topmost portion which has a width that is just slightly less than the space between the link ends measured at the topmost portion such that the intermeshed link ends at the topmost portion are substantially in contact and contribute to the smooth top surface. The bottom portion of the link ends, however, are not as thick. This results in a space being provided between adjacent bottom portions of intermeshed link ends. The space between the bottom portions of intermeshed link ends allows for easy cleaning, and is suitable for receiving tracking teeth located around the perimeter of a drive sprocket. The lower portion of the connecting structure includes a tooth member integrally molded and extending transverse to the connecting structure about midway between the two pluralities of link ends. In a preferred embodiment, the tooth member extends the full width of the module and includes driving surfaces on opposing sides such that the module and consequently the belt formed from a multiplicity of modules can be moved in two directions. Thus, each sprocket includes "tracking" teeth located around the perimeter of a drive sprocket, as well as a plurality of recesses for receiving the tooth members located on the modules so as to provide the necessary force to drive the belt.

BRIEF DESCRIPTION OF THE DRAWINGS

The above features of the present invention will be more clearly understood from consideration of the following description in connection with accompanying drawings in which.

BEST KNOWN MODE FOR PRACTICING THIS INVENTION

Figure 1:
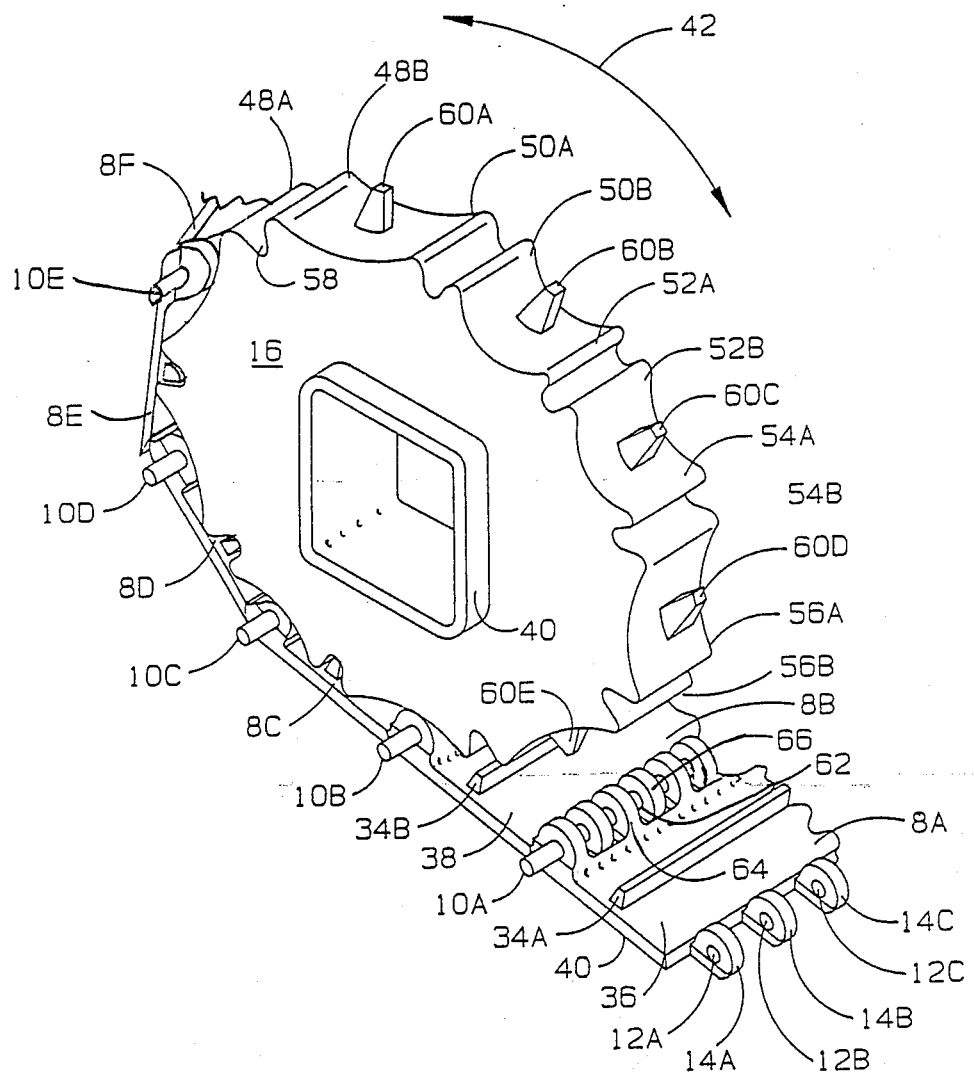
FIG. 1 is a partially sectional perspective view of a portion of a plastic module conveyor belt and sprocket which illustrate the unique tracking and drive technique of the heavy duty conveyor belt of this invention.
Figure 2:
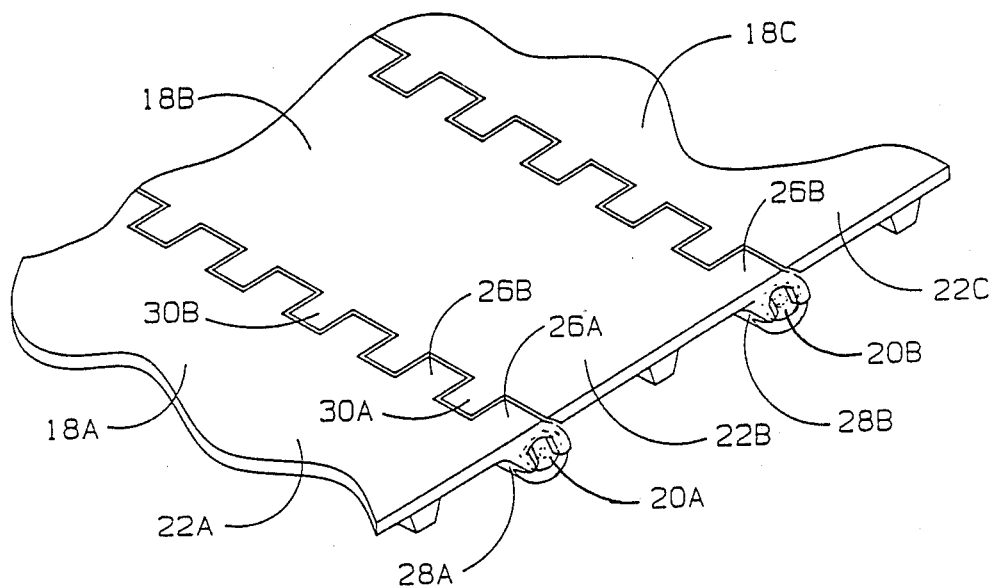
FIG. 2 is a top perspective view of a portion of the belt of FIG. 1 more clearly showing the offset link ends and the smooth, flush top.
Figure 4:
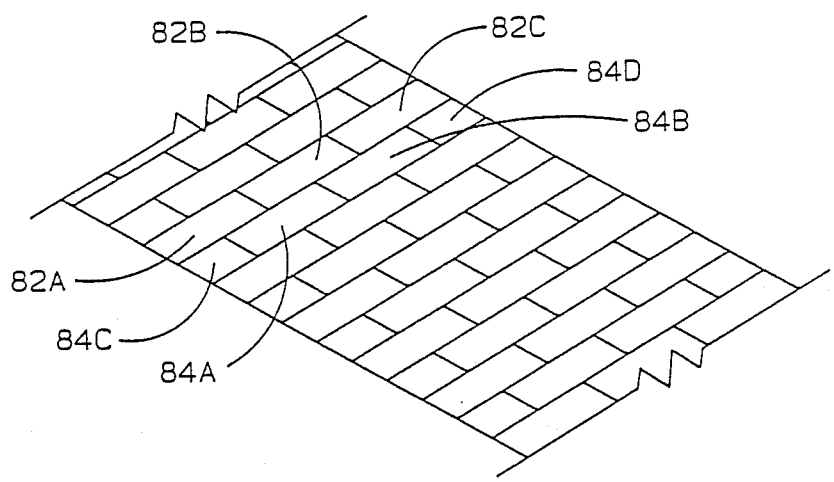
FIG. 4 is a diagramatic sketch showing how the belt of this invention may be brick-layed to form a belt of any selected width.
Figure 3:
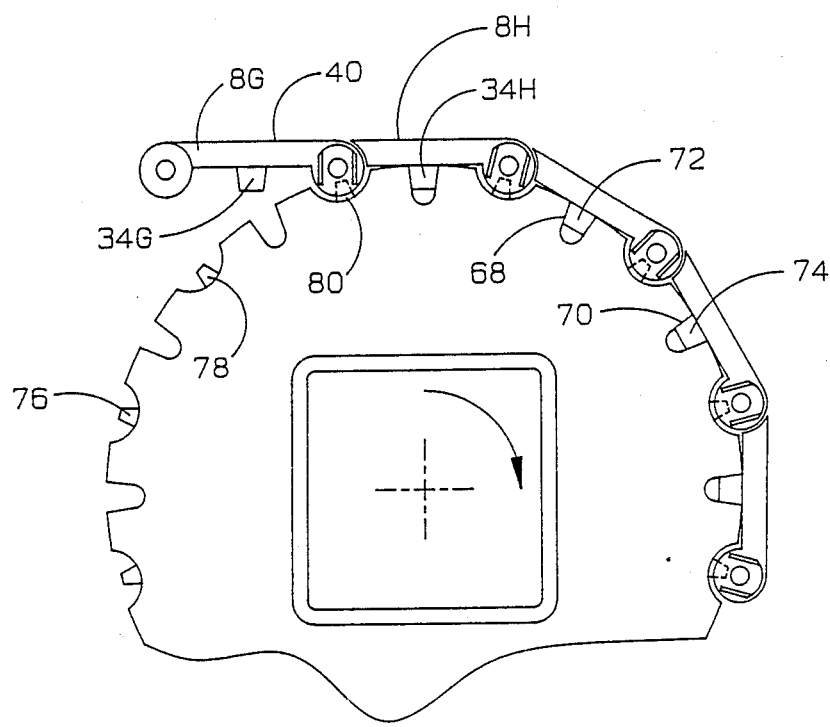
FIG. 3 is a side view of a module of this invention engaged with a sprocket of the invention.

Referring now to the Figs., there is shown by FIG. 1, a perspective view of a portion of a plastic modular conveyor belt being driven by a cooperating sprocket which belt and sprocket incorporate the features of this invention. FIG. 2 shows a top perspective view of the belt of FIG. 1, and FIG. 3 shows a side view of the belt and intermeshed sprocket. As shown, a series of modules 8A, 8B, 8C, 8D, 8E and 8F are pivotally connected or joined by means of pivot rods 10A,10B, 10C, 10D and 10E which extend through apertures such as apertures 12A, 12B and 12C defined in link ends of 14A, 14B, and 14C of module 8A. The modules 8A through 8F as shown in FIG. 1A are illustrated with only three link ends such as link ends 14A, 14B, and 14C of module 8A. However, it will be appreciated that a belt typically could be substantially wider than three link ends, and each module could have a significantly larger number of link ends such as for example on the order of nine or even twenty or more link ends. In addition, as will be discussed hereinafter with respect to FIG. 4, a multiplicity of modules may themselves be laid side-by-side to form a belt even wider than a single module. In the embodiment of FIG. 1, a bottom perspective view of the modules is shown to better illustrate the manner in which the modules intermesh with a drive sprocket 16. FIG. 2 on the other hand, illustrates a top perspective view which shows partial modules 18A, 18B and 18C joined by "headed" pivot rods 20A and 20B. It is important to note with respect to FIG. 2, that the the top surfaces 22A, 22B and 22C of the intermediate structure or central portion of the modules are integrally molded with the topmost portions of the intermeshed link ends, such as for example topmost portion 26A and 26B on link ends 28A and 28B (not visible) of module 18A intermeshed with topmost portion 30A and 30B on link ends 32A, and 32B (not visible) of module 18B. Thus, a flat, flush, smooth top is provided when the conveyor is not traveling over the sprockets. It will be appreciated of course that modules 18A, 18B and 18C could be a part of the conveyor belt shown in FIG. 1. Referring again to FIG. 1 and FIG. 3, it should be noticed that each of the modules include a single transverse tooth member or structure such as tooth member 34A of module 8A and 34B of module 8B integrally molded to the bottom surface 36 and 38 of the connecting or intermediate structure of module 8A and 8B respectively. In FIG. 3, tooth member 34G and 34H are molded to module 8G and 8H. As will be appreciated by those skilled in the art, in addition to providing a smooth top surface as discussed above, the connecting structure of the module holds the individual link ends together and in a parallel relationship with each other.

It is, of course understood, that fabrication of a belt by using modules in this manner to form a conveyor belt is simple and also allows for easy repair not possible in flexible, rubber, or one piece belts. The transverse tooth members 34A and 34B also serve in a unique way as a means for applying the orthogonal force by a drive sprocket to the belt to cause movement of the belt. As shown in FIG. 1, it is seen that drive sprocket 16 includes a hub member 40 by which a rotational force, indicated by double-headed arcuate arrow 42, imparts rotation in both directions to the sprocket 16. Also as shown in the embodiment of FIG. 1, a series of double peak tooth members such as tooth members 44A and 44B, 46A and 46B, 48A and 48B, 50A and 50B, 52A and 52B, 54A and 54B, and 56A and 56B are located around the periphery of the sprocket. Using double peak tooth 48A and 48B as an example, it is seen that each of the double peak tooth members define a recess such as recess 58 between peaks 48A and 48B. And as can be seen by referring to the drawing of FIG. 1, the recesses defined by these tooth members, straddle the transverse member located between the link ends, and is thereby able to provide a driving force in either direction such as is indicated by the double-headed arcuate arrow 42. More specifically, the sprocket provides a driving force having at least a vector which is orthogonal to the direction of travel such that the belt will be propelled in the desired direction. To avoid scrubbing of the transverse teeth members as they enter and leave the recess defined by the double peaks of a sprocket tooth member, it will be appreciated that the cross-section of the transverse members has a substantially trapezoidal shape which cooperates with a similar shape of the recesses defined by the double peaks of the sprocket teeth. It will further be appreciated by those skilled in the art that by fabricating the recesses between the double peaks very wide with respect to the thickness of the transverse members it may be possible to achieve a workable but sloppy interface between the recesses and the transverse teeth even if the sides of the recesses and the sides of the transverse teeth are perpendicular to the long dimension of the elongated members. However, to achieve a satisfactory working engagement or interface of the transverse or cross-member within the recess defined by the double peaks of a tooth, the cooperating trapezodial shape is preferred.

It will be appreciated by those skilled in the art, however, that it is often very important that a belt should track. That is, it should not slide from side to side such that the edges of the belt rub and/or wear against the conveyor belt support structure. However, as can be seen from FIG. 1, since the transverse tooth members, such as tooth member 34A, are continuous and extend substantially from edge to edge of a module. And since the recesses of sprocket 16 which receive the tooth members could slide from edge to edge of the module, it can be seen that tracking cannot be achieved by the normal intermeshing of the sprocket 16 recesses and the module teeth. Consequently, sprocket 16, of this invention also includes narrow "tracking" teeth, such as tracking teeth 60A, 60B, 60C, 60D and 60E located around the perimeter of sprocket 16 and between drive teeth 48, 50, 52, 54 an 56. To receive these "tracking" teeth on the sprocket, the bottom portions of intermeshing link ends have a substantially narrower width than the topmost portion of the link ends which provide the flush smooth top or surface of the conveyor belt as discussed above. Thus, as can be seen in FIG. 1 a space is provided between bottom portions of intermeshed link ends, such as space 62 between intermeshed link ends 64 and 66. Therefore, if sprocket 16 is locked on its drive shaft (not shown) against lateral movement and if sprocket 16 were to rotate, in a clockwise direction, then tracking tooth 60E would be engaged between the bottom portion of intermeshed link ends 64 and 66 and provide tracking. That is, the conveyor belt and sprocket could not move laterally with respect to each other. The side view of FIG. 3, clearly shows the interaction of the sprocket drive teeth 68 and 70 and the module teeth 72 and 74 to drive the coneyor belt, and the sprocket tracking teeth 76, 78 and 80 and the intermeshed link ends for providing tracking.

It will be understood, of course, by those skilled in the art that conveyor belts are required to be in all sizes of width and length to accomplish various types of conveying needs. Consequently, it is highly desirable that the belting system by made of modules or units which can be placed together in an end-to-end and side-by-side relationship so as to form a belt of any width and length.

FIG. 3 illustrates how a belt of the type shown in FIGS. 1 and 2 may be made of identical modules having a single width along with a few partial or half modules so as to form a belt three modules wide but which also has substantially the strength of a single module across the belt. The strength of the belt is achieved as a result of the intermeshing and interlocking of the pivot ends. As shown, the full length modules 82A, 82B and 82C are simply laid side-by-side across the width of the belt. Each row on both sides of the modules comprised of modules 82A, 82B and 82C include two full size modules such as modules 84A and 84B and two partial modules such as 84C and 84D. When this brick-layed pattern is continued for the length of the belt, the belt has substantially more strength across its width than it would without the brick-laying.

Also, in a preferred embodiment, the link ends on one side of the module are not directly in line with the link ends on the other side. That is, there is a slight offset in the link ends equivalent to the thickness of a link end such that when the modules are intermeshed, the first plurality of link ends of each module is aligned with the first plurality of link ends of every other pivotally connected module. In a similar manner, each second plurality of link ends of a module is aligned with each second plurality of link ends of every other pivotally connected module. However, the first plurality of link ends are not in line with the second plurality of link ends of any module. This arrangement of link ends allows the "tracking" teeth to be in line and also will allow the edges of a belt to be flush or straight.

Figure 5:
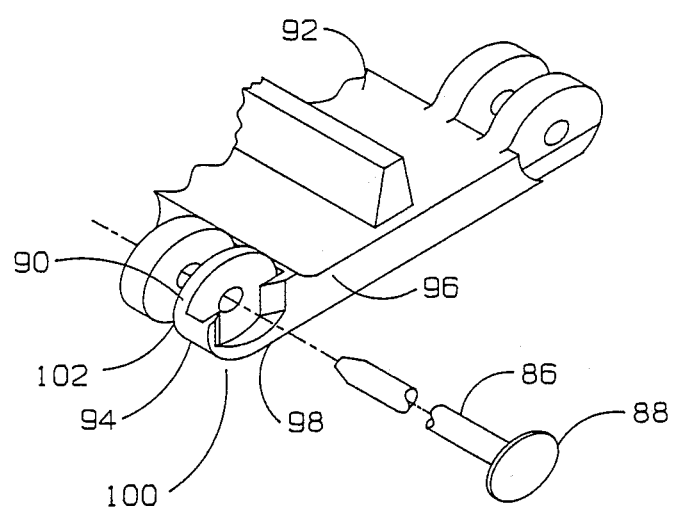
FIG. 5 is a perspective view, of an edge module of the belt of FIGS. 1 and 2 illustrating a unique technique for releasably engaging the multiplicity of pivot rods used in constructing the conveyor belt.

Like most if not all plastic modular conveyor apparatus, the modules of the apparatus of this invention are held together by pivot rods such as pivot rods 10A, 10B and 10C discussed above. To keep the pivot rods from coming out enlarged areas or "heads" are usually formed on each end of the rod which extends across the width of the belt. Consequently when a broken module has to be replaced or other changes made to the belt, a "head" on one end of the rod must be cut off and the rod removed. After the repair is completed, a new rod is then inserted to hold the modules together and "heads" are then formed on both ends. Referring now to FIG. 5 there is shown a new technique, for securing a single headed rod in a conveyor belt. Use of the single head may allow the rod to be removed without destruction, and eliminates the requirement of forming new heads on the rod. As shown rod 86 with a single head 88 preformed is provided. In addition the outer most link end of an edge module, such as link end 90 of module 92 includes at least one resilient snap member such as snap members 94 and 96 which are positioned so as to provide a slight obstruction to head 88 when rod 86 is fully inserted. However, as can be seen, snap members 94 and 96 have ramp surfaces 98 and 100 which allows the rod head 88 to be forced past the resilient snap members 94 and 96 so as to be received in the recess 102 located between the snap members 94 and 96 and the outer most link end 90. Thus, it is not necessary to include a head on the other end of the pivot rod to prevent the rod from coming out of the intermeshed link ends. However, by applying sufficient force the resilient snap members 94 and 96 may be pushed aside sufficiently to allow head 88 of the pivot rod to pass such that in some circumstances the rod can be removed without cutting off the head. Consequently, the pivot rod may be re-used, and the time and expense of forming two heads on a new rod is eliminated.

Thus, although there has been described to this point particular embodiments of modules for forming heavy duty, smooth, flush top conveyor belts which use a single central transverse member for providing a driving force, and sprocket which provide for both driving and tracking, it is not intended that such specific references be considered as limitations upon the scope of this invention except in-so-far as set forth in the following claims.

I claim:

1. Conveyor apparatus having a smooth top surface comprising:
   a multiplicity of modules each having a top and bottom, a pair of edges and a first and second end, said multiplicity of modules being aligned end-to-end in a direction of travel and further including,
   first and second pluralities of link ends located at said first and second ends respectively,
   said link ends of said first plurality defining pivotal apertures arranged along a first pivotal axis and said link ends of said second plurality defining pivotal apertures aligned along a second pivot axis, each plurality of link ends of each module being intermeshed with link ends of another module such that said first and second pivot axis are aligned,
   said first and second pluralities of link ends having a topmost portion and a bottom portion, said topmost portion having a width selected such that said topmost portion of said intermeshed link ends are substantially in contact and provide a smooth top surface, and said bottom portion having a width selected such that a space of a selected size is provided between adjacent bottom portions of such intermeshed link ends,
   an integrally molded connecting structure, having a lower portion and a smooth top surface, for joining said first and second pluralities of link ends, said connecting structure including a tooth member integrally molded to said lower portion, and located substantially mid-way between said first and second pluralities of link ends, said integrally molded tooth member having a driving surface defined on at least one side of said toothed member for receiving a driving force to move said module and a conveyor belt constructed from said multiplicity of modules in said direction of travel;
   a multiplicity of pivot rods extending through said pivotal apertures of said intermeshed first and second pluralities of link ends to form a conveyor belt; and
   a plurality of drive sprockets arranged in driving relationship along a shaft oriented transverse to said direction of travel, each of said sprockets including a plurality of recesses located around the perimeter of said sprockets for receiving said tooth members of said modules and for providing driving forces to said module, and a plurality of teeth located between said recesses around said perimeter, said teeth having a width less than said space and extending radially from said perimeter such that said teeth extend into said spaces provided between said bottom portions of said intermeshed link ends.

2. The conveyor apparatus of claim 1, wherein the first plurality of link ends of a module are offset with respect to the second plurality of link ends.

3. The conveyor apparatus of claims 1 or 2, wherein a driving surface is defined on opposing sides of said tooth member so that said conveying apparatus can be moved in two directions.

4. The conveyor apparatus of claims 1 or 2, wherein said multiplicity of modules are brick-layed to form a conveyor belt having a width wider than the width of a single module.

5. The conveyor apparatus of claim 1, wherein said integrally molded tooth member extends parallel to said pivotal axis.

6. The conveyor apparatus of claim 5, wherein the first plurality of link ends of a module are offset with respect to the second plurality of link ends.

7. The conveyor apparatus of claim 5, wherein a driving surface is defined on opposing sides of said tooth member so that said conveying apparatus can be moved in two directions.

8. The conveyor apparatus of claim 5, wherein said multiplicity of modules are brick-layed to form a conveyor belt having a width wider than the width of a single module.

9. The conveyor apparatus of claims 1 or 2 wherein the outside most link end of said conveyor belt includes a resilient snap member to partially obstruct the insertion of a pivot rod into the apertures of aligned and intermeshed link ends, such that the snap member may be resiliently moved to one side as the pivot rod is inserted until the end passes the snap member and provides a stop to prevent the pivot rod from coming out during operation of the conveyor apparatus.

* * * * *